(12) United States Patent
Berti et al.

(10) Patent No.: US 9,951,637 B2
(45) Date of Patent: Apr. 24, 2018

(54) SEAL FOR A ROTARY MACHINE

(76) Inventors: Matteo Berti, Florence (IT); Stefano Bresciani, Florence (IT); Ravindranath Ps, Bangalore (IN); Lorenza Sassolini, Florence (IT); Alessandro Ciani, Florence (IT)

( * ) Notice: Subject to any disclaimer, the term of this patent is extended or adjusted under 35 U.S.C. 154(b) by 363 days.

(21) Appl. No.: 14/343,406

(22) PCT Filed: Sep. 6, 2012

(86) PCT No.: PCT/EP2012/067446
§ 371 (c)(1),
(2), (4) Date: Apr. 6, 2015

(87) PCT Pub. No.: WO2013/034655
PCT Pub. Date: Mar. 14, 2013

(65) Prior Publication Data
US 2015/0226076 A1    Aug. 13, 2015

(30) Foreign Application Priority Data

Sep. 7, 2011    (IT) .............................. CO2011A0036

(51) Int. Cl.
*F16J 15/34*    (2006.01)
*F16J 15/447*    (2006.01)
(Continued)

(52) U.S. Cl.
CPC .......... *F01D 11/001* (2013.01); *F01D 11/003* (2013.01); *F01D 11/02* (2013.01);
(Continued)

(58) Field of Classification Search
CPC .......... F16J 15/002; F16J 15/162; F16J 15/34; F16J 15/3404; F16J 15/447; F16J 15/4472; F01D 11/02; F01D 11/003; F01D 25/12
(Continued)

(56) References Cited

U.S. PATENT DOCUMENTS 1,795,311 A * 3/1931 Meyer .................... F01D 11/00
                                                277/412
2,223,519 A   12/1940 Hornschuch
(Continued)

FOREIGN PATENT DOCUMENTS

CN    1369620 A    9/2002
CN    2635997      8/2004
(Continued)

OTHER PUBLICATIONS

Unofficial English Translation of Japanese Office Action issued in connection with corresponding JP Application No. 2014528977 dated Jul. 5, 2016.
(Continued)

*Primary Examiner* — Nicholas L Foster
(74) *Attorney, Agent, or Firm* — GE Global Patent Operation

(57) ABSTRACT

A rotary machine includes a machine rotor, a machine stator, a labyrinth seal disposed between the machine rotor and the machine stator, a dry gas seal disposed between the machine rotor and the machine stator, the dry gas seal being disposed downstream of the labyrinth seal, the labyrinth seal including a labyrinth seal rotor, and, a labyrinth seal stator, the labyrinth seal stator having a cavity containing a heat transfer medium configured to transfer heat between the labyrinth seal stator and a zone adjacent the labyrinth seal stator to cool or heat a pressurized process fluid before the process fluid bears against the dry gas seal.

12 Claims, 6 Drawing Sheets

(51) Int. Cl.

| | | |
|---|---|---|
| *F01D 11/00* | (2006.01) | |
| *F01D 11/02* | (2006.01) | |
| *F01D 11/18* | (2006.01) | |
| *F01D 11/24* | (2006.01) | |
| *F01D 25/12* | (2006.01) | |
| *F16J 15/00* | (2006.01) | |
| *F01D 11/04* | (2006.01) | |

(52) U.S. Cl.
CPC ............ *F01D 11/025* (2013.01); *F01D 11/04* (2013.01); *F01D 11/18* (2013.01); *F01D 11/24* (2013.01); *F01D 25/12* (2013.01); *F16J 15/002* (2013.01); *F16J 15/3404* (2013.01); *F16J 15/447* (2013.01); *F16J 15/4472* (2013.01)

(58) Field of Classification Search
USPC .......................................................... 277/930
See application file for complete search history.

(56) References Cited

U.S. PATENT DOCUMENTS

| | | | | |
|---|---|---|---|---|
| 3,874,676 | A | * | 4/1975 | Taylor ..................... F01D 11/00 |
| | | | | 277/422 |
| 4,109,920 | A | | 8/1978 | Warner |
| 4,114,899 | A | * | 9/1978 | Kulzer ................. F16J 15/3404 |
| | | | | 277/367 |
| 4,872,689 | A | * | 10/1989 | Drumm .................. F16J 15/162 |
| | | | | 165/179 |
| 5,516,121 | A | * | 5/1996 | Bolusset ................ F16J 15/162 |
| | | | | 277/319 |
| 5,718,560 | A | * | 2/1998 | Lorenzen ............. F16J 15/3404 |
| | | | | 277/361 |
| 6,533,284 | B2 | | 3/2003 | Aksit et al. |
| 6,959,929 | B2 | | 11/2005 | Thermodyn |
| 7,306,424 | B2 | | 12/2007 | Romanov et al. |
| 2007/0102139 | A1 | | 5/2007 | Puggioni et al. |
| 2009/0196743 | A1 | * | 8/2009 | Ueno .................... F01D 11/003 |
| | | | | 415/174.5 |
| 2011/0305558 | A1 | | 12/2011 | Omori |
| 2013/0177420 | A1 | * | 7/2013 | Winn ...................... F01D 11/00 |
| | | | | 416/95 |

FOREIGN PATENT DOCUMENTS

| | | | |
|---|---|---|---|
| CN | 1796727 | A | 7/2006 |
| EP | 0623768 | A1 | 11/1994 |
| EP | 0781948 | A1 | 7/1997 |
| EP | 1222400 | A1 | 7/2002 |
| EP | 1914387 | A1 | 4/2008 |
| GB | 231143 | A | 10/1925 |
| GB | 956835 | A | 4/1964 |
| GB | 1301309 | A | 12/1972 |
| JP | 46006929 | B | 2/1971 |
| JP | 02130296 | A | 5/1990 |
| JP | 02190676 | A | 7/1990 |
| JP | 09217630 | A | 8/1997 |
| JP | 2003525377 | A | 8/2003 |
| JP | 2007506021 | A | 3/2007 |
| JP | 2010121463 | A | 6/2010 |
| WO | 20100095507 | A1 | 8/2010 |

OTHER PUBLICATIONS

Unofficial English Translation of Russian Office Action issued in connection with corresponding RU Application No. 2014108246 dated Jul. 14, 2016.

Unofficial English Translation of Chinese Office Action issued in connection with corresponding CN Application No. 201280054574.6 dated Feb. 3, 2015.

Italian Search Report and Written Opinion dated Aug. 1, 2012 which was filed in connection with the Italian Patent Application No. CO2011A000036 which was filed on Sep. 7, 2011.

International Search Report and Written Opinion dated Oct. 5, 2012 which was filed in connection with the PCT Patent Application No. PCT/EP2012/067446.

Unofficial English Translation of Japanese Office Action issued in connection with corresponding JP Application No. 2014528977 dated Mar. 7, 2017.

* cited by examiner

SEAL FOR A ROTARY MACHINE

BACKGROUND OF THE INVENTION

Embodiments of the subject matter disclosed herein generally relate to rotary or turbo machines and more particularly to heat management in compressors provided with a dry gas seal.

During the past years, with the increase in price of fossil fuels, the interest in many aspects related to the processing of fossil fuels has increased. During processing of fossil fuels, fluids are transported from on-shore or offshore locations to processing plants for subsequent use. In other applications, fluids may be transported more locally, for example, between sub-systems of a hydrocarbon processing plant to facilitate distribution to end-users.

At least some fluid transport stations use rotary machines, such as compressors, fans and/or pumps that are driven by gas turbines. Some of these turbines drive the associated fluid transport apparatus via a gearbox that either increases or decreases a gas turbine output drive shaft speed to a predetermined apparatus drive shaft speed. In other rotary machines, electrically-powered drive motors, or electric drives are used in place of (or in conjunction with) mechanical drives (i.e., gas turbines) to operate the rotary machine. Regardless of the particular setting, i.e. on-shore, off-shore, etc. and regardless of whether the rotary machine is turbine or motor driven, there is an ever present need to increase the efficiency, decrease the costs, and reduce the environmental impact of fossil fuel processing, and in particular, of rotary machines involved in such processing.

One particular area of concern is heat management. Rotary or turbo machines and compressors in particular, oftentimes require supplemental systems to facilitate heat management, i.e. the removal or addition of heat. Proper heat management has grown even more important with the now prevalent use of high performance components which oftentimes are more sensitive to heat related problems.

For example, many rotary machines now incorporate the use of one or more dry gas seals to improve machine performance and reduce process fluid leakage. Dry gas seals typically include a dry gas seal stator (a non-rotating ring) and a dry gas seal rotor (a rotatable ring). During operation of a rotary machine including a dry gas seal, grooves in the dry gas seal stator and rotor generate a fluid dynamic force causing the dry gas seal stator to separate from the dry gas seal rotor to create a "running gap" between the dry gas seal stator and rotor. The typical "running gap" is quite small, on the order of microns. With such tight tolerances, dry gas seals are particularly vulnerable to damage, particularly when subjected to operating conditions exceeding those for which the dry gas seal was designed.

For example, pressurized process fluids may reach temperatures greater than the temperature range for which the dry gas seal was designed. If the process fluid is particularly hot, even temporary exposure of such pressurized fluids to the dry gas seal may heat the dry gas seal outside the temperature range for which the dry gas seal was designed. It is therefore desirable in certain circumstances to cool the process fluid before the process fluid bears against the dry gas seal.

Low process fluid temperatures also threaten the proper operation of dry gas seals. For example, during episodes of temporary machine shut down, a portion of the process fluid in the proximity of a dry gas seal may undergo an endothermic process, e.g. depressurization, during which the temperature of the process fluid may drop significantly. A precipitant or other non-gaseous matter may thereby be produced in the process fluid. Such precipitants or other non-gaseous matter may have significant hardness and take on the form of a particulate. If such particulates make their way to the dry gas seal at startup, the particulates may, for example, abrade the surfaces of the dry gas seal rotor and/or stator which define the "running gap". Such damage may necessitate costly machine shut down and repairs. It is therefore also desirable in certain circumstances to heat the process fluid before the process fluid bears against the dry gas seal.

It is also important to note that even if one is able to heat or cool the process fluid, such heating and cooling will oftentimes be ineffective to prevent temperature related damage to the rotary machine, and specifically, the dry gas seal, if the temperature of the process fluid changes faster than one is able to heat or cool the gas. In other words, if the temperature of the process gas changes abruptly, for example, during a pressure surge, and the solution, means, or structure for cooling the process gas is implemented in such a way that the lag time in process fluid temperature response is too great, then, regardless of the attempt to heat or cool the process fluid, the dry gas seal may still be damaged.

Therefore, it is also desirable in certain circumstances to have the option of changing the temperature of the process fluid quickly, particularly, process fluid which may bear against the dry gas seal.

BRIEF SUMMARY OF THE INVENTION

According to an exemplary embodiment a rotary machine includes a machine rotor and a machine stator. A labyrinth seal and a dry gas seal are disposed between the machine rotor and the machine stator. The dry gas seal is disposed downstream of the labyrinth seal. Also, the labyrinth seal includes a labyrinth seal rotor, and a labyrinth seal stator, the labyrinth seal stator having a cavity containing a heat transfer medium configured to transfer heat between the fluid seal stator and a zone adjacent the fluid seal stator to cool or heat a pressurized process fluid before the process fluid bears against the dry gas seal.

According to another exemplary embodiment a method of operating a rotary machine to process a fluid includes sealing a rotor of the rotary machine using a dry gas seal and a labyrinth seal, wherein leakage of the fluid flows from the labyrinth seal to the dry gas seal; and changing a temperature of the leakage fluid as the leakage fluid passes the labyrinth seal.

According to another exemplary embodiment a rotary machine includes a machine rotor and a machine stator. A first seal is disposed between the machine rotor and the machine stator. A second seal is disposed between the machine rotor and the machine stator, the second seal being disposed downstream of the first seal. The first seal including a seal rotor; and, a seal stator, the seal stator having a cavity containing a heat transfer medium configured to transfer heat between the first seal stator and a zone adjacent the first seal stator to cool or heat a pressurized process fluid before the process fluid bears against the second seal.

DETAILED DESCRIPTION OF THE EXEMPLARY EMBODIMENTS OF THE INVENTION

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a rotary machine that has a stator and a rotor. However, the embodiments to be discussed next are not limited to these exemplary systems, but may be applied to other systems.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
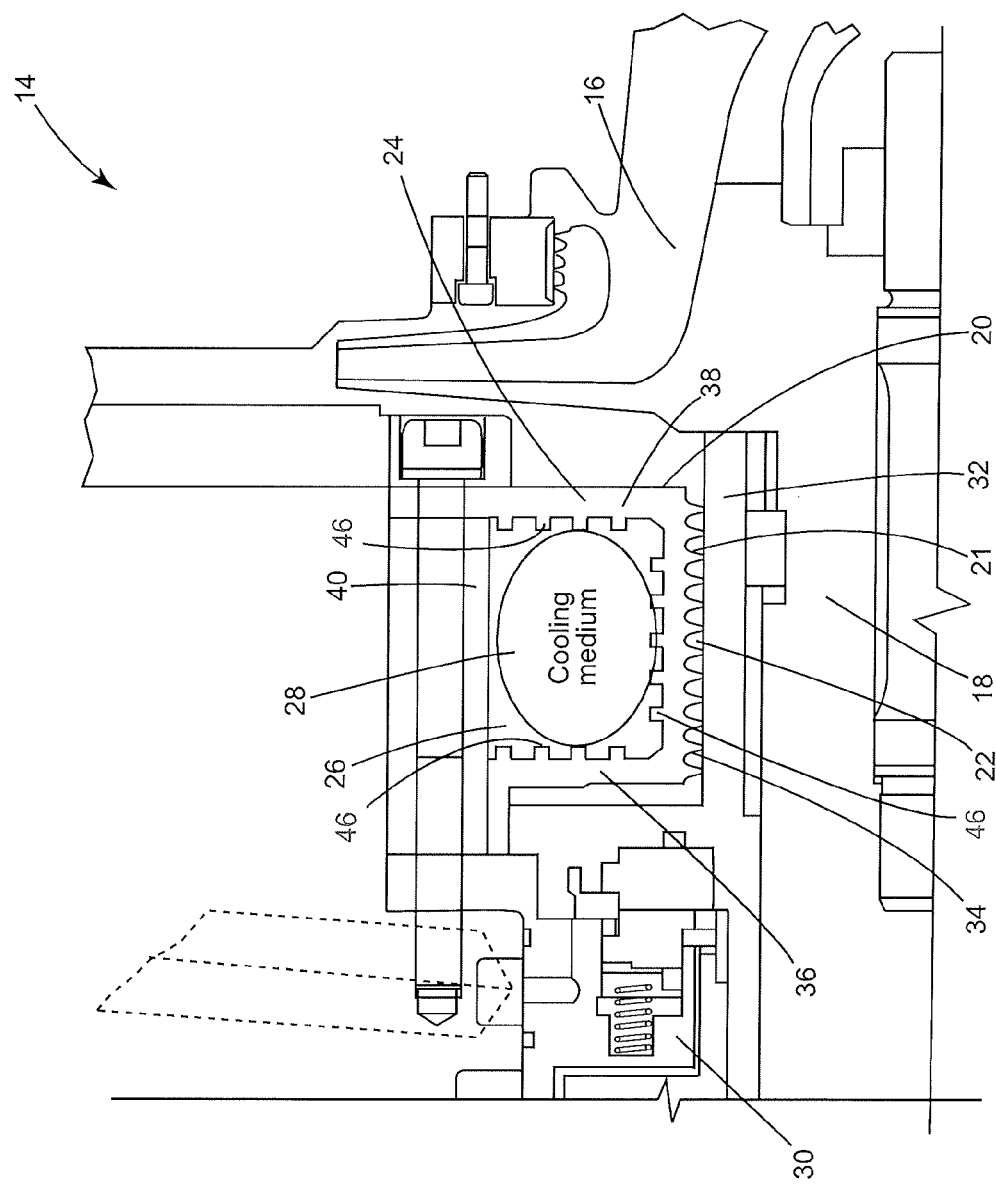
FIG. 1 is a cross-sectional view of a rotary machine according to an exemplary embodiment and having a labyrinth seal and a dry gas seal.

An exemplary embodiment of a rotary machine 14 according to the present invention is shown in FIG. 1. Rotary machine 14 is a centrifugal compressor including a machine rotor 16, having a shaft mounted overhung impeller, and a machine stator 18, in the form of a housing. Compressor 14 may be used to pressurize a fluid, typically, a process gas or gases, in order to render the fluid more suitable for further processing or use. Exemplary process gases include, but are not limited to, carbon dioxide, hydrogen sulfide, butane, methane, ethane, propane, natural gas, or a combination thereof As shown in FIG. 1, compressor 14 includes both a labyrinth seal 20 and a dry gas seal 30. More specifically, labyrinth seal 20 and dry gas seal 20 are disposed between the machine rotor 16 and the machine stator 18 to prevent process fluid leakage from the compressor. As further shown in FIG. 1, dry gas seal 30 is disposed around the machine rotor 16 at a position downstream of the labyrinth seal 20 relative to the pressurized process fluid. As a result of this configuration, only process fluids which pass through labyrinth seal 20 bear against dry gas seal 30.

In the exemplary embodiment shown in FIG. 1, a labyrinth seal 20 according to an exemplary embodiment includes a labyrinth seal rotor 22 and a labyrinth seal stator 24 having a cavity 26. Cavity 26 is provided with a heat transfer medium 28 for transferring heat between labyrinth seal 20 and a zone adjacent to the labyrinth seal stator 24. In the exemplary embodiment shown in FIG. 1, this zone is indicated generally as 32 and defines the entire surroundings of labyrinth seal stator 24. As will be discussed in greater detail below, the labyrinth seal stator 24 may be configured to provide predetermined zone characteristics. For example, labyrinth seal stator 24 may define a single localized zone or, as another example, labyrinth seal stator 24 may be configured to provide multiple discrete zones each having a different shape and/or heat conduction rate.

In the exemplary embodiment of FIG. 1, the cooling medium is, in an embodiment, a liquid, such as water, for facilitating heat transfer between labyrinth seal stator 24 and zone 32. It is important to note that heat transfer medium may also be a non-aqueous liquid, a solid, a gas, or any combination thereof. For example, heat transfer medium may be a composite substance that only protects against temperature spikes in the process fluid. More specifically, heat transfer medium may be configured such that once a threshold temperature is reached, the heat transfer medium is activated. For example, heat transfer medium may be configured to instantaneously sublimate at a certain temperature, and thereby provide a fuse-like function, i.e. tripping and cooling the process fluid to protect against heat related damage. Note that heat transfer medium 28 may be replaced with any mechanical, chemical or electrical structure or means which causes a transfer of heat between the labyrinth seal stator 24 and zone 32.

As further shown in FIG. 1, labyrinth seal stator includes a sealing face portion 34 with a plurality of grooves or teeth 21, a first side portion 36, a second side portion 38 and a third side portion 40. The teeth 21 on labyrinth sealing face portion 34 are configured to induce turbulence, i.e. small localized currents, in the pressurized fluid to impede the progress of process fluid through the seal.

The number of grooves or teeth is configured to form a tortuous path, or "labyrinth" between the stationary portion, or "stator," and the rotating portion, or "rotor," of the compressor. Labyrinth seals may be statoric, in which the teeth are formed on the stator, or rotoric, in which the teeth are formed on the rotor. The grooves or teeth of the labyrinth seal and opposing surface impede the flow of fluids from the high pressure region to the low pressure region through the labyrinth seal. However, a space or clearance is necessary between the labyrinth grooves or teeth and an opposing surface to allow rotation of the rotor. Thus, although labyrinth seals impede fluid flow, the clearance allows highly pressurized fluid from the high pressure region to leak through the clearance to the low pressure region due to a pressure differential across the labyrinth seal. Labyrinth seals in general are designed to contain this leakage.

Leakage flow through the labyrinth seal may be reduced by decreasing the clearance. To this end, abradable labyrinth seals have been applied. Abradable labyrinth seals are rotoric labyrinth seals in which a statoric portion that opposes the rotoric teeth is formed of an abradable material. Clearances in abradable labyrinth seals may be made very small because when the rotoric teeth rub against the abradable stator such as occurs, for example, due to rotoric vibration during transient conditions, the rotoric teeth cut into the abradable material of the stator, thereby increasing the clearance.

According to this embodiment the teeth 21 of labyrinth seal stator sealing face portion 34 are configured to provide not only a sealing effect but also a heat exchanging effect. More specifically, the teeth 21 are configured to provide a surface area for contacting the process fluid. Since the labyrinth seal introduces turbulence to the fluid as the process fluid travels along the "tortuous path" defined by teeth 21, the rate at which heat may be exchanged between sealing face portion 34 and zone 32 is even further enhanced.

Figure 2:
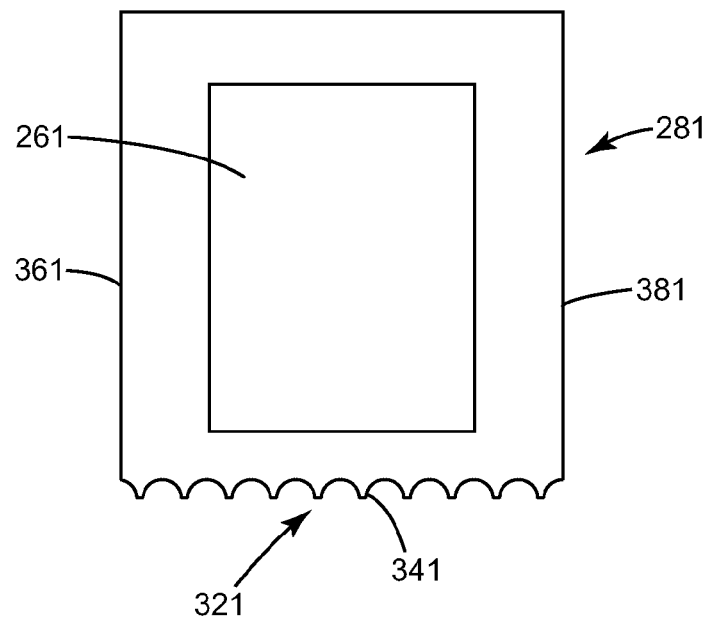
FIG. 2 is a cross-sectional view of a labyrinth seal stator according to an exemplary embodiment.

The first side portion 36 and the second side portion 38 of labyrinth seal stator 24 extend between the sealing portion 34 and the third side portion 40 of the labyrinth seal stator 24. Also, in the exemplary embodiment shown in FIG. 1, the sealing face portion 34, first side portion 36 and second side portion 38 are of equal thickness. It is important to note however that each portion may have a different thickness, for example, in order to establish different characteristics for zone 32. For example, and as shown in FIG. 2, a labyrinth seal stator 281 may include a sealing face portion 341 having a lesser thickness than the first side portion 361 and second side portion 381. Such an arrangement may be used, for example, to provide a greater rate of heat transfer at the sealing face 381, i.e., a special zone 321, and/or to increase the rigidity of the labyrinth seal stator 281.

Figure 3:
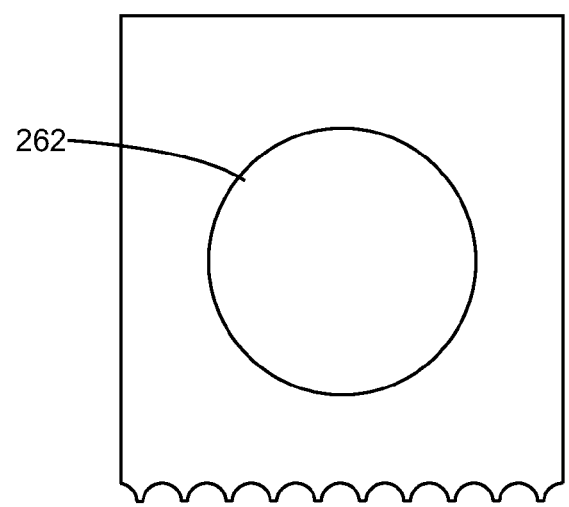
FIG. 3 is a cross-sectional view of a labyrinth seal stator according to an exemplary embodiment.
Figure 4:
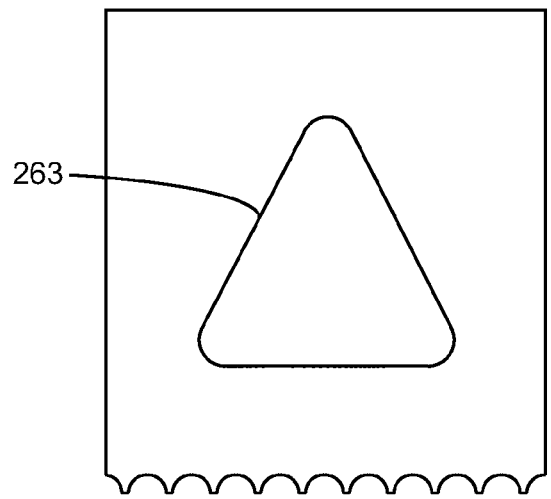
FIG. 4 is a cross-sectional view of a labyrinth seal stator according to an exemplary embodiment.
Figure 5:
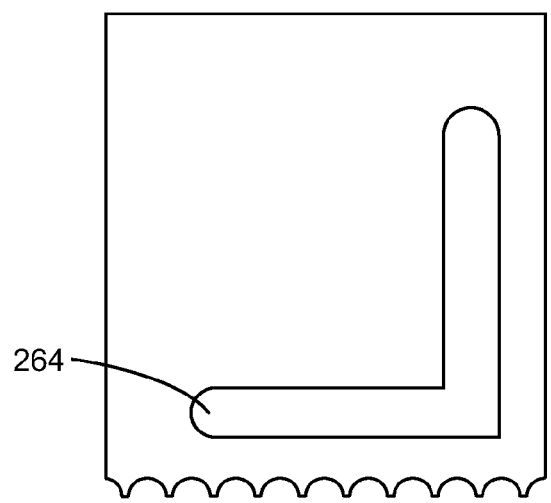
FIG. 5 is a cross-sectional view of a labyrinth seal stator according to an exemplary embodiment.
Figure 6:
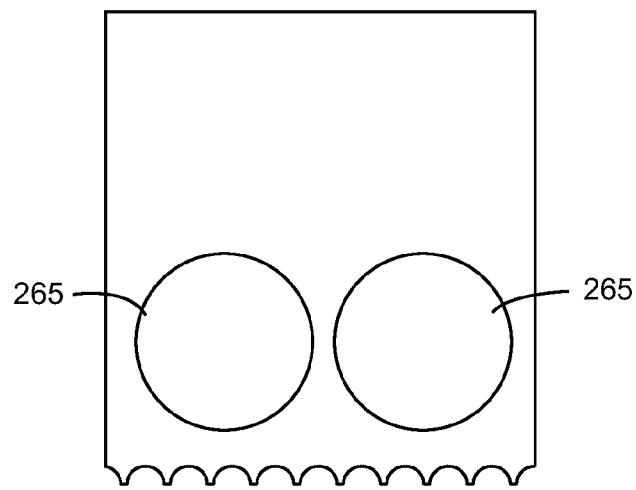
FIG. 6 is a cross-sectional view of a labyrinth seal stator according to an exemplary embodiment.

Note that each of the sealing face portion 34, first side portion 36, second side portion 38 and third side portion 40 are also each provided with an outer surface facing the zone 32 and an inner surface facing the cavity 26. In the embodiment shown in FIG. 1, these outer and inner surfaces are substantially parallel. Thus, in the exemplary embodiment shown in FIG. 1, the cavity 26 is provided generally with a square cross-sectional shape. Other cross sectional shapes for the cavity 26 are contemplated and include, for example, regular shapes, such as round cavity 262 and triangular cavity 263, as shown in FIGS. 3 and 4, and irregular shapes, such as the L-shape cavity 264 shown in FIG. 5. Still further, the cross-sectional shape of cavity 26 may vary along the length of the cavity, thus, for example, the cavity may have a larger cross-section at a point along labyrinth seal stator 26 where zone 32 is particularly hot. Also, multiple cavities may be used within a labyrinth seal stator according to the present invention, for example, see the side-by-side circular cavities 265 shown in FIG. 6. Each cavity may include a different fluid transfer medium, for example, one cavity may include a water based heat transfer medium at a first temperature and the other cavity may include an oil based heat transfer medium at a second temperature.

Figure 7:
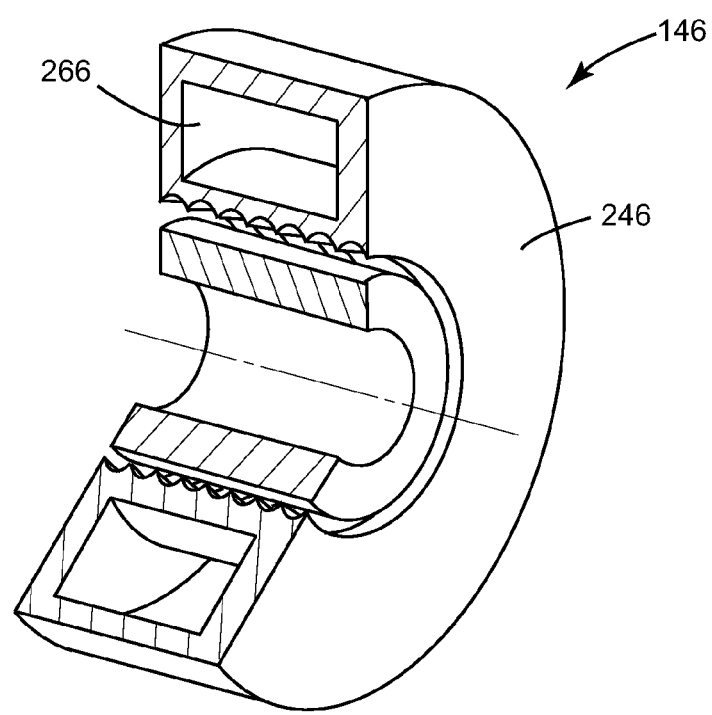
FIG. 7 is a cut-away perspective view of a labyrinth seal according to an exemplary embodiment.
Figure 8:
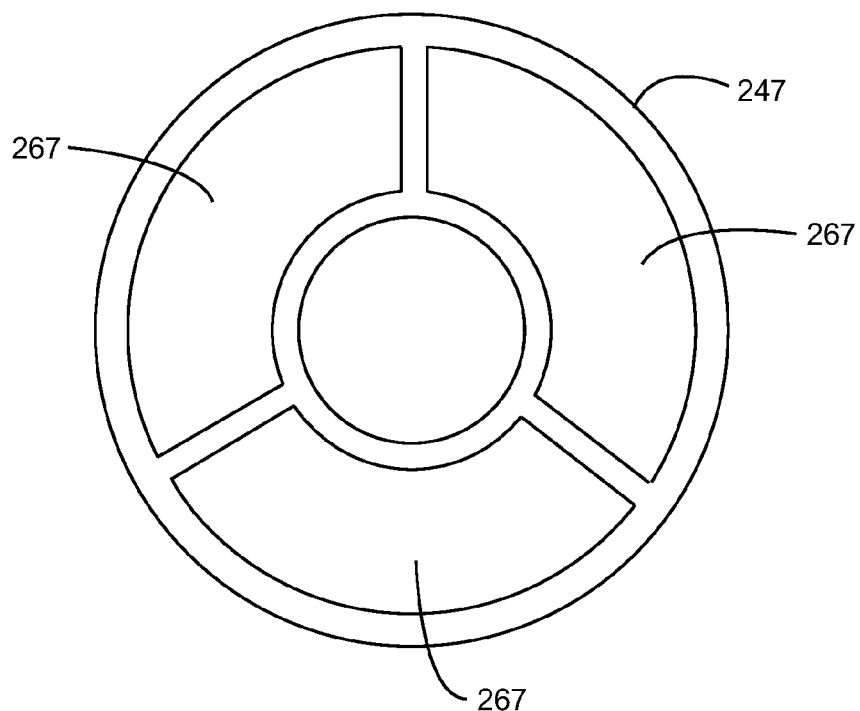
FIG. 8 is a side cross-sectional view of a labyrinth seal stator according to an exemplary embodiment.

As shown in FIG. 7, a labyrinth seal 146 according to an exemplary embodiment may be configured with a cavity 266 extending continuously around labyrinth seal stator 246. However, other configurations for cavity 26 are also possible. For example, and as shown in the exemplary embodiment of FIG. 8, a labyrinth seal stator 247 may be configured to provide a segmented cavity 267.

In the exemplary embodiment shown in FIG. 1, labyrinth seal stator 24 includes a plurality of fins 46 extending into cavity 26. Fins 46 may be used, for example, to provide a greater amount of surface area of labyrinth seal stator 24 exposed to the heat transfer medium and/or to induce or reduce turbulence in heat transfer medium 28. Fins 46 located on the inner surface of sealing face portion 34 can be configured with the teeth 21 on the labyrinth seal stator sealing face portion 34 to optimize heat transfer between the process fluid in the portion of zone 32 within labyrinth seal 20 and heat transfer medium 28. It should be noted that these and other modifications, such as rifling, knurling, electroplating, and/or etching, may be used generally to provide an increase in the rate at which heat may be transferred between labyrinth seal stator 24 and zone 32 or otherwise improve the performance of labyrinth seal 20.

Figure 9:
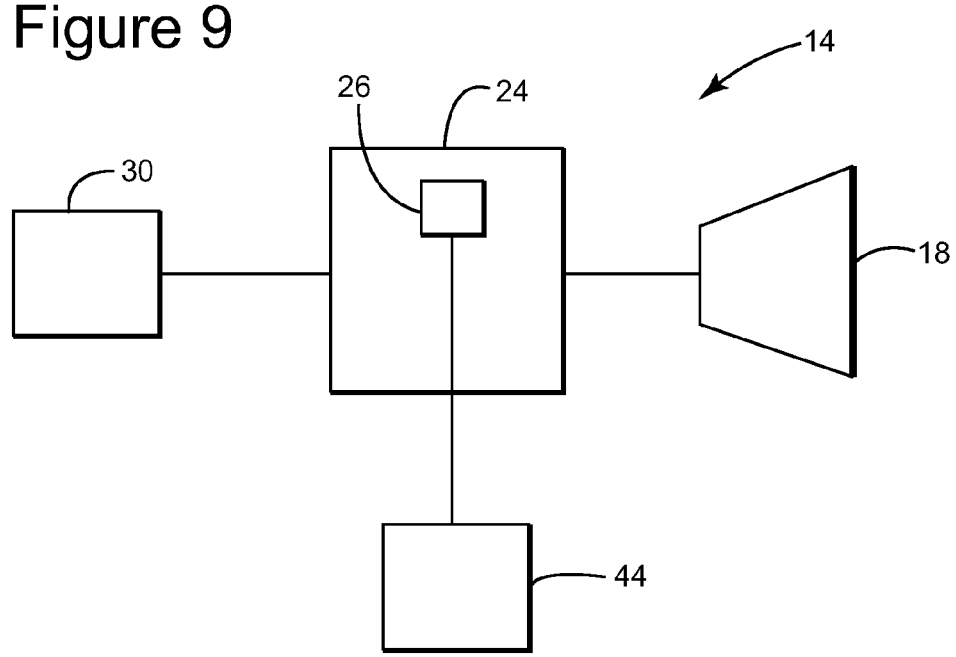
FIG. 9 is a schematic of a compressor according to an exemplary embodiment.

As shown in the schematic view of FIG. 9, rotary machine 14 may be further provided with a heat exchanger 44 in fluid communication with cavity 26 in labyrinth seal stator 24. Heat transfer medium 28 may circulate between cavity 26 and heat exchanger 44, for example, by natural convection, or as another example, by the aid of a pump (not shown). It is important to note that in the schematic representation shown in FIG. 7, rotary machine 14 may have independent return and supply lines in fluid communication with cavity 26 and heat exchanger 44. Further, and as will be described in greater detail below, rotary machine 14 may have multiple supply lines and multiple return lines in such fluid communication with one or more cavities within labyrinth seal stator 24.

During operation of compressor 14, a portion of the compressed process gas travels across the labyrinth seal face portion 34 and bears upon the dry gas seal 30. As previously discussed, if the temperature of the process gas is too high or too low, there is an increased risk of damage to dry gas seal 30. Thus, according to exemplary embodiments, the process gas may be heated or cooled by the labyrinth seal 20 upstream of the dry gas seal 30 to a temperature whereby the risk of damage to the dry gas seal 30 is greatly diminished or eliminated.

During steady state operation of rotary machine 14, hot process gas may impinge on the second side portion 38 of labyrinth seal 20 causing heat from the process gas to propagate through side portion 38 of labyrinth seal stator 24 into heat transfer medium 28 thereby lowering the temperature of the process gas. As the process gas then finds its way through the "tortuous path" presented by the labyrinth seal 20, more heat from the process gas may travel across the sealing face portion 34 of labyrinth seal stator 24 for absorption by heat transfer medium 28 thereby even further lowering the temperature of the process gas.

Cavity 28 may be configured such that a natural convection current easily "sets up" whereby the heat transfer medium carries the heat away from a hotter region, for example, adjacent the second side wall portion 38 and/or the sealing face portion 34 to a cooler region, for example, adjacent the third side portion 40, where the heat transfer medium may cool before returning to a hotter region within cavity 26. In this manner, the process gas may be cooled and thereby more safely bear against the dry gas seal 30.

In embodiments of rotary machine 14 which include a heat exchanger 44 the rate at which heat may be added or removed from the process gas is greatly increased. This capability is even further increased when a pump (not shown) is used to circulate the heat transfer medium between cavity 26 and heat exchanger 44.

Another aspect of various embodiments is the proximity of the cavity 26, and thus, the heat transfer medium 28, to the sealing face portion 34 of the labyrinth seal stator 24, i.e., the portion of zone 32 adjacent labyrinth seal stator teeth 21. Because of this proximity, the lag time in process fluid temperature response may be significantly reduced. This feature is beneficial (but not required) since it allows for near instantaneous "corrections" to be made to the process gas temperature.

Another feature of rotary machine 14 is that since the dry gas seal 30 is disposed farther downstream from the pressurized gas than the labyrinth seal, there exists a certain travel time between when the process fluid passes through the labyrinth seal and when the process fluid bears against the dry gas seal. For example, consider that temperature measurements are taken by a sensor (not shown) or sensors (not shown) in, on, around or proximal to rotary machine 14 according to another embodiment. If these measurements indicate that, despite having been cooled by the labyrinth seal stator, a temperature of the process fluid leaving the labyrinth seal 20 is such that a risk of damage to the dry gas seal 30 is indicated, then, due to the travel time of the process fluid, steps may yet be taken to protect the dry gas seal 30, for example, the rotary machine may be shut down, or as another example, a super cooling procedure may be initiated wherein a super cooled heat transfer medium, for example, liquid nitrogen, is introduced to labyrinth seal cavity 26.

According to some embodiments, the system can be provided with a temperature sensor. The temperature sensor can be placed downstream of the cooling system to monitor the temperature of cooling means. The value of the sensed temperature can be used to regulate the mass flow of the cooling means by, for example, varying the heat transfer based on the sensed temperature and the temperature specifications of the dry gas seal. The sensed temperature can also, or alternatively, be used to protect the compressor so that, for example, when the temperature of the cooling means exceeds a maximum allowable value the compressor can be shut down. It should be noted that the illustrated centrifugal compressor is merely an exemplary embodiment, and a labyrinth seal in accordance with the described embodiment may also be applicable to other machines requiring a seal having the capability to heat or cool a process fluid.

Figure 10:
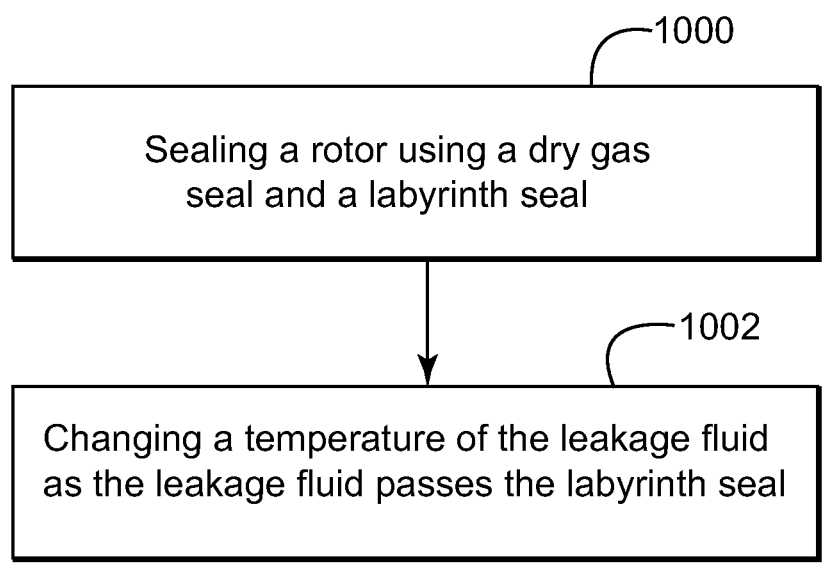
FIG. 10 is a flow chart illustrating a method of operating a rotary machine according to an embodiment.

Thus, according to an embodiment as shown in the flowchart of FIG. 10, a method for operating a rotary machine can include the steps of sealing 1000 a rotor using a dry gas seal and a labyrinth seal and changing 1002 a temperature of the leakage fluid as the leakage fluid passes the labyrinth seal.

The above-described embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A rotary machine, comprising:
   a machine rotor;
   a machine stator;
   a labyrinth seal disposed between the machine rotor and the machine stator; and
   a dry gas seal disposed between the machine rotor and the machine stator, the dry gas seal being disposed downstream of the labyrinth seal;
   the labyrinth seal comprising:
      a labyrinth seal rotor; and
      a labyrinth seal stator, wherein the labyrinth seal stator is an annular ring with a substantially rectangular cross section, is coaxial with the labyrinth seal rotor, the labyrinth seal stator comprising:
      a sealing face portion on an inner circumference of the labyrinth seal stator, the sealing face portion comprises sealing teeth proximate to an outer circumferential surface of the labyrinth seal rotor, a first side portion, a second side portion, and a third side portion, the first side portion and the second side portion extending between the sealing face portion and the third side portion, and wherein the sealing face portion, the first side portion, the second side portion and the third side portion each comprise an outer surface facing a zone and an inner surface facing the cavity; and
      a cavity containing a heat transfer medium configured to transfer heat between the labyrinth seal stator and the zone adjacent the labyrinth seal stator to cool or heat a pressurized process fluid before the process fluid bears against the dry gas seal.

2. The rotary machine according to claim 1, wherein the labyrinth seal stator is configured to cool the pressurized process fluid to a temperature less than a maximum operating temperature of the dry gas seal.

3. The rotary machine according to claim 1, wherein the heat transfer medium comprises water.

4. The rotary machine according to claim 1, wherein pressurized process fluid passes through the zone adjacent the labyrinth seal stator.

5. The rotary machine according to claim 1, wherein the sealing face portion, the first side portion and the second side portion are equal in thickness.

6. The rotary machine according to claim 1, the inner and outer surfaces of the sealing face portion are parallel, the inner and outer surfaces of the first side portion are parallel, the inner and outer surfaces of the second side portion are parallel, and the inner and outer surface of the third side surface are parallel.

7. A rotary machine, comprising:
   a machine rotor;
   a machine stator;
   a first seal disposed between the machine rotor and the machine stator; and
   a second seal disposed between the machine rotor and the machine stator, the second seal being disposed downstream of the first seal;
   the first seal comprising:
      a seal rotor; and
      a seal stator,
      the seal stator being an annular ring with rectangular cross section that is coaxial with the seal rotor, the seal stator having a sealing face portion on its inner circumference, the sealing face portion comprising sealing teeth proximate to an outer circumferential surface of the seal rotor, a first side portion, a second side portion, and a third side portion, the first side portion and the second side portion extending between the sealing face portion and the third side portion, and wherein the sealing face portion, the first side portion, the second side portion and the third side portion each comprise an outer surface facing a zone and an inner surface facing the cavity, and the seal stator comprising a cavity containing a heat transfer medium configured to transfer heat between the seal stator and the zone adjacent the seal stator to cool or heat a pressurized process fluid before the process fluid bears against the second seal.

8. The rotary machine according to claim 7, wherein the seal stator is configured to cool the pressurized process fluid to a temperature less than a maximum operating temperature of the second seal.

9. The rotary machine according to claim 7, wherein the heat transfer medium comprises water.

10. The rotary machine according to claim 7, wherein pressurized process fluid passes through the zone adjacent the seal stator.

11. The rotary machine according to claim 7, wherein the sealing face portion, the first side portion and the second side portion are equal in thickness.

12. The rotary machine according to claim 7, the inner and outer surfaces of the sealing face portion are parallel, the inner and outer surfaces of the first side portion are parallel, the inner and outer surfaces of the second side portion are parallel, and the inner and outer surface of the third side surface are parallel.

\* \* \* \* \*